(12) United States Patent
Segal

(10) Patent No.: US 11,269,485 B2
(45) Date of Patent: Mar. 8, 2022

(54) SYSTEM AND METHOD FOR MANAGEMENT OF AN ONLINE GROUP

(71) Applicant: Efraim Segal, Haifa (IL)

(72) Inventor: Efraim Segal, Haifa (IL)

(73) Assignee: Efraim Segal, Haifa (IL)

( * ) Notice: Subject to any disclaimer, the term of this patent is extended or adjusted under 35 U.S.C. 154(b) by 0 days.

(21) Appl. No.: 16/902,277

(22) Filed: Jun. 16, 2020

(65) Prior Publication Data

US 2020/0310628 A1  Oct. 1, 2020

Related U.S. Application Data

(63) Continuation of application No. 15/876,452, filed on Jan. 22, 2018, now abandoned.

(60) Provisional application No. 62/511,974, filed on May 27, 2017.

(51) Int. Cl.
| | |
|---|---|
| *G06F 3/0481* | (2013.01) |
| *G06Q 50/00* | (2012.01) |
| *G06F 3/0484* | (2013.01) |
| *H04L 12/58* | (2006.01) |
| *G06F 3/0485* | (2013.01) |
| *H04M 1/7243* | (2021.01) |
| *G06F 3/04817* | (2022.01) |
| *G06F 3/04842* | (2022.01) |
| *H04L 51/04* | (2022.01) |
| *H04L 51/52* | (2022.01) |
| *H04L 51/046* | (2022.01) |

(52) U.S. Cl.
CPC ........ *G06F 3/04817* (2013.01); *G06F 3/0485* (2013.01); *G06F 3/04842* (2013.01); *G06Q 50/01* (2013.01); *H04L 51/04* (2013.01); *H04L 51/046* (2013.01); *H04L 51/32* (2013.01); *H04M 1/7243* (2021.01); *H04M 2250/22* (2013.01)

(58) Field of Classification Search
None
See application file for complete search history.

(56) References Cited

U.S. PATENT DOCUMENTS

| | | | |
|---|---|---|---|
| 10,516,629 B2 * | 12/2019 | Wang | G06F 3/0481 |
| 2005/0195076 A1 | 9/2005 | Lund et al. | |
| 2007/0150810 A1 | 6/2007 | Katz et al. | |
| 2008/0034317 A1 | 2/2008 | Fard et al. | |
| 2009/0083655 A1 | 3/2009 | Beharie et al. | |
| 2009/0177978 A1 * | 7/2009 | Hagale | H04L 51/04 |
| | | | 715/753 |

(Continued)

OTHER PUBLICATIONS

Slack, "Making messages interactive," Apr. 17, 2017, https://web.archive.org/web/20170417013313/https://api.slack.com/interactive-messages.*

(Continued)

*Primary Examiner* — Ryan Barrett
(74) *Attorney, Agent, or Firm* — Pearl Cohen Zedek Latzer Baratz LLP

(57) ABSTRACT

A system and method for management of online communication may include presenting a first screen enabling a user to communicate in a group chatroom over an instant messaging platform and, based on a single click on a button in the first screen, presenting a second screen enabling the user to view group's shared content over a social media platform is presented. An embodiment may revert to the first screen based on a single click on a button in the second screen.

14 Claims, 7 Drawing Sheets

GROUP CHATROOM

(56) References Cited

U.S. PATENT DOCUMENTS

| | | | |
|---|---|---|---|
| 2010/0022276 A1 | 1/2010 | Mee-Yeon et al. | |
| 2010/0088634 A1 | 4/2010 | Kohki et al. | |
| 2011/0105187 A1 | 5/2011 | Dobroth et al. | |
| 2011/0264736 A1 | 10/2011 | Ahrens et al. | |
| 2012/0005602 A1 | 1/2012 | Anttila et al. | |
| 2013/0055112 A1* | 2/2013 | Joseph | H04L 51/04 715/758 |
| 2013/0097513 A1* | 4/2013 | Adarraga | G06F 3/0484 715/736 |
| 2013/0332543 A1 | 12/2013 | Jungmin et al. | |
| 2014/0201285 A1 | 7/2014 | Kong | |
| 2014/0215352 A1 | 7/2014 | Blecon et al. | |
| 2014/0229888 A1 | 8/2014 | Shinhui et al. | |
| 2015/0046864 A1 | 2/2015 | Fujii | |
| 2015/0350123 A1 | 4/2015 | Myung-Hee et al. | |
| 2015/0271113 A1 | 9/2015 | Ahn | |
| 2015/0371196 A1 | 12/2015 | Lee | |
| 2016/0036737 A1* | 2/2016 | Atamel | G06F 16/9537 715/752 |
| 2016/0154556 A1 | 6/2016 | Cheung et al. | |
| 2016/0170566 A1* | 6/2016 | Herman | G06F 3/04817 715/808 |
| 2016/0330148 A1 | 11/2016 | John et al. | |
| 2016/0337291 A1 | 11/2016 | Park et al. | |
| 2017/0237698 A1 | 8/2017 | Besnard | |
| 2017/0353414 A1* | 12/2017 | Ertmann | H04L 51/32 |
| 2018/0124559 A1 | 5/2018 | Raye et al. | |
| 2018/0183748 A1* | 6/2018 | Zhang | H04L 51/32 |

OTHER PUBLICATIONS

Slack, "Making messages more interactive with buttons," Nov. 15, 2016, https://web.archive.org/web/20161115045641/https://api.slack.com/docs/message-buttons.*

Slack, "Attaching interactive message menus," May 13, 2017, https://web.archive.org/web/20170513112242/https://api.slack.com/docs/message-menus.*

Slack, "A field guide to interactive messages," May 3, 2017, https://web.archive.org/web/20170503212907/https://api.slack.com/docs/interactive-message-field-guide.*

Messenger, "Make Decisions in Messenger with Messenger Polls," Sep. 22, 2016, https://www.facebook.com/messenger/photos/a.882538591865822.1073741828.602814669838217/1048819688571044/.*

Hoang, "How Do I Find All the Pictures inside a Facebook Chat?", Oct. 20, 2014, https://www.tech-receipes.com/rx/50235/how-do-i-find-all-the-pictures-inside-a-facebook-chat/.

Henry, "Google Hangouts Unifies Photos, Video, and a Chat in one Standalone App", May 15, 2013, https://lifehacker.com/google-hangouts-unifies-photos-video-and-chat-in-a-st-506813191.

Office Action for Israel Patent App. No 256693, dated Dec. 30, 2020.

* cited by examiner

| Message Type Unique Identifier | Poll question text Message | Poll Type and poll Time Window | 1495391012 |

Super-Message text has been changed to reflect user's vote

SYSTEM AND METHOD FOR MANAGEMENT OF AN ONLINE GROUP

CROSS-REFERENCE TO RELATED APPLICATIONS

This application is a continuation of U.S. patent application Ser. No. 15/876,452, filed on Jan. 22, 2018, which claims the benefit of U.S. Provisional Patent Application No. 62/511,974, filed on May 27, 2017, which is incorporated in its entirety herein by reference.

FIELD OF THE INVENTION

The present invention relates generally to management of chat groups and social platforms. More specifically, the present invention relates to social networking platforms intertwined with instant or other messaging and/or chat platforms.

BACKGROUND OF THE INVENTION

Social networks or platforms and instant or other messaging and/or chat platforms are known in the art. Chatrooms are known in the art as a service, website, location or area on a network such as the Internet, where chatroom members can communicate. The terms "chat room", "chatroom" and "chat-room" as referred to herein may mean, or relate to, the same thing and may be used herein interchangeably. Group chatrooms typically suffer from high volume of chat messages traffic and the huge number of messages per time in a chatroom makes it difficult for group (or chatroom) members to follow all messages and can thus bring the situation in the chatroom to chaos. For example, group members often miss some of the messages (e.g., since they are rolled up) and therefore do not react as sometimes expected or required. Therefore, a group member might find it impossible to follow and react to all the messages in the group's chatroom. In an Instant Messaging (IM) platform an individual user can communicate only with his contacts but cannot communicate, from within the IM platform, with a community that is based on, or related to, another platform, e.g., a social network or platform.

Generally, social networking services or platforms are used by people to build social networks or social relations, enabling any user to create his/her own profile in order to post and publish his/her own user-generated or other content. In a social networking platform, the individual user can usually access content from any user in the platform. Typically, in social networks, it is required that a group of people will share the same profile in order to post and publish group related content. There currently exists no system or method that combines IM, chatrooms and social network platforms. Additionally, there currently exists no system or method that can adequately manage traffic in chatrooms.

SUMMARY OF THE INVENTION

In some embodiments, a first screen enabling a user to communicate in a group chatroom over an instant messaging platform is presented; and based on a single click on a button in the first screen, a second screen enabling the user to view group's content over a social media platform is presented.

An embodiment may revert to the first screen based on a single click on a button in the second screen. The second screen may show content shared by members of the group chatroom. Content shown in the second screen may be selectively shared with at least one of: members of the group chatroom, friends of members of the group chatroom and with the entire community of the social media platform.

An embodiment may include presenting an interactive message in a predefined position in the first screen; and maintaining the predefined position during scrolling through content in the first screen. An embodiment may include distinguishing an interactive message by at least one of: a foreground color, a background color, a sound, displaying the interactive message in a popup window, displaying the interactive message in a floating window and prioritizing the interactive message by placing it as the last received message thus maintaining it as the newest received message.

In some embodiments, an interaction of a user with the interactive message may be reflected in a set of corresponding interactive messages presented to a respective set of users. An interactive message may be related to at least one of: a task of the group, a survey, a poll, a group reminder and an event related to at least some of the group members. Yet another interactive message is a group reminder that is a message and logic related to a predefined location and time. In some embodiments, a click on an interactive group reminder message displays at least one of: the group members who arrived at the location, an estimated time of arrival of group members at the location and the arrival time of group members to the location.

Information related to the group reminder may be provided to a provider of services or goods or gear for the group activity, as defined in in an associated reminder, (where the activity is derived/defined by/in the reminder type or content) and the provider may be permitted or enabled to send commercial or offers messages to a group's chatroom with or without having detailed information about the group members. For example, server 210 provides a supplier with anonymous data such as location, time and type of activity, number of participants, average age and so on but avoid providing the supplier with any personal data such as names, phone numbers and the like. The supplier can send messages to the chatroom via server 210, thus, privacy of group members is protected and preserved.

An interactive reminder message may be updated based on at least one of: an arrival of a group member to the location, a delay in arrival of a group member to the location and a departure of a group member from the location. An embodiment may perform at least one action related to an interactive reminder message. For example, based on one of: an arrival of a group member to a meeting location, a delay in arrival of a group member to the location and/or a departure of a group member from the location, server 210 may send a message to the chatroom, cause each of computing devices 220 and/or 230 to sound an alarm, popup a display and so on.

An embodiment may include receiving a future time window for sending a message; receiving a set of at least one message to be sent; and randomly selecting one or more messages included in the set and sending the selected messages during the time window.

An embodiment may include receiving a future time window for sharing content; receiving a set of one or more content objects; and sharing one or more content objects included in the set during the time window. An embodiment may include automatically performing at least one of: sharing content and sending a message based on at least one of: an event, a location and a condition. An embodiment may include receiving a time interval value; receiving a set of one or more content objects and a set of one or more text messages; and performing at least one of: after sharing one or more content objects included in the set, waiting for at least the time interval and then posting, in a chatroom, at least one of the text messages, and after posting one or more text messages included in the set, waiting for at least the time interval and then sharing at least one of the text messages. Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, mod- ules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
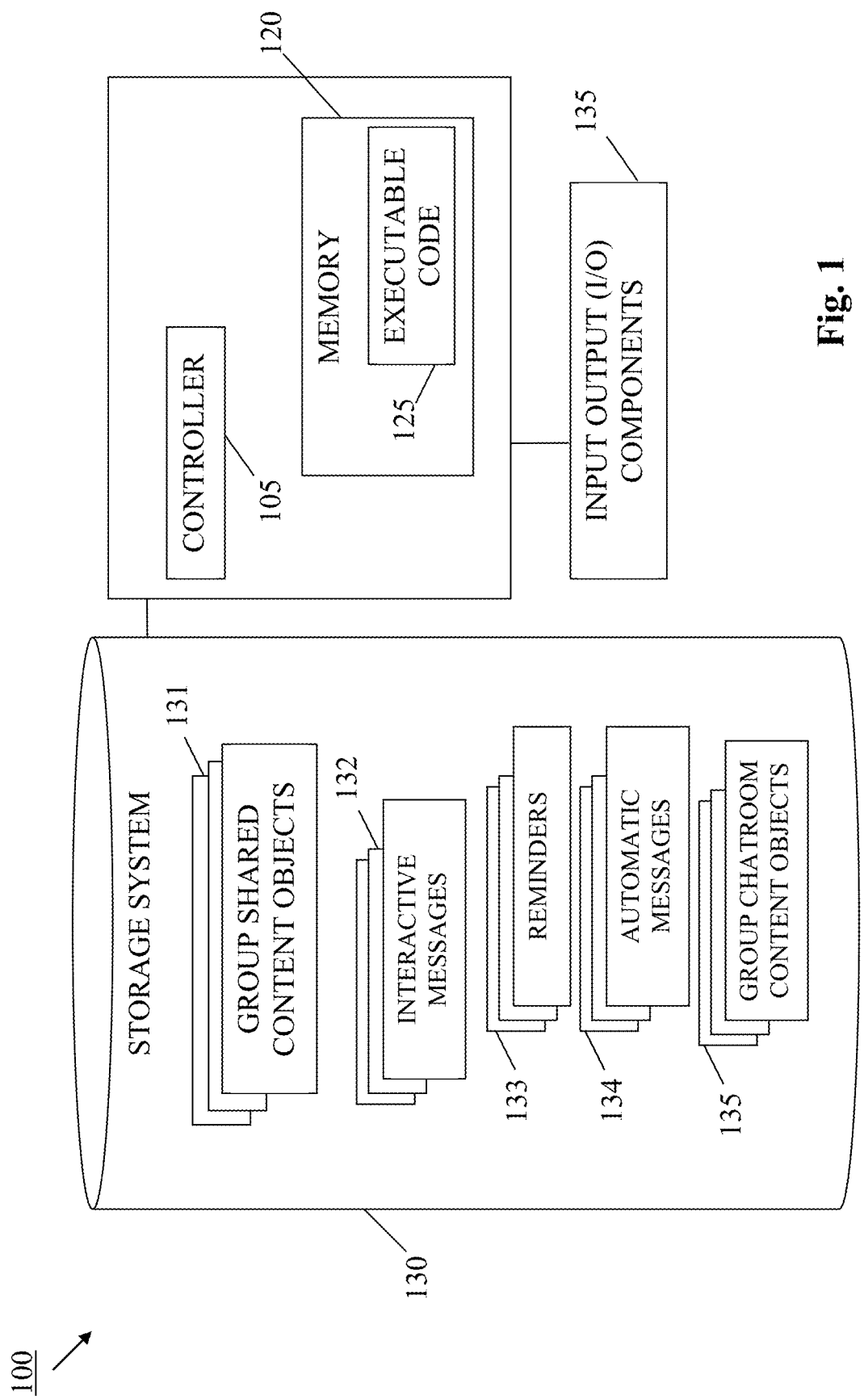
FIG. 1 shows high level block diagram of a computing device according to illustrative embodiments of the present invention.

Reference is made to FIG. 1, showing a non-limiting, high-level block diagram of a computing device or system 100 that may be used to manage and/or participate in online groups according to some embodiments of the present invention. Computing device or system 100 may include a controller 105 that, in some embodiments, is a hardware controller. For example, hardware controller 105 may be, or may include, a central processing unit processor (CPU), a chip or any suitable computing or computational device. Computing system 100 may include a memory 120, executable code 125, a storage system 130 and input/output (I/O) components 135. Controller 105 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing devices 100 may be included in, and one or more computing devices or systems 100 may be, or may act as the components of, a system according to some embodiments of the invention.

In some embodiments memory 120 is a hardware memory. For example, memory 120 may be, or may include machine-readable media for storing software e.g., a Random-Access Memory (RAM), a read only memory (ROM), a memory chip, a Flash memory, a volatile and/or non-volatile memory or other suitable memory units or storage units. Memory 120 may be or may include a plurality of, possibly different memory units. In some embodiments memory 120 is a computer or processor non-transitory readable medium, or a computer non-transitory storage medium, e.g., a RAM. Some embodiments include a non-transitory storage medium having stored thereon instructions which when executed cause a hardware processor to carry out methods disclosed herein.

Executable code 125 may be an application, a program, a process, task or script. A program, application or software as referred to herein may be any type of instructions, e.g., firmware, middleware, microcode, hardware description language etc. that, when executed by one or more hardware processors or controllers 105, cause a processing system or device (e.g., system 100) to perform the various functions described herein.

Executable code 125 may be executed by controller 105 possibly under control of an operating system. For example, executable code 125 may be an application that manages chatrooms and content of a group and enables users to share content as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. As shown, storage system 130 may include group shared content objects 131, interactive messages 132, reminders 133, automatic messages 134 and group chatroom content objects 135. Objects included or stored in storage system 130 may collectively and/or individually referred to hereinafter using their respective numerals merely for simplicity purposes, for example, several interactive messages 132 or an interactive message 132.

Content may be loaded from storage system 130 into memory 120 where it may be processed by controller 105. For example, an interactive message 132 may be loaded into memory 120 and used for conducting a poll as further described herein. The term "poll" as used in this application refers to any survey, vote or questionnaire that may be provided to a plurality of users in a chatroom and used for receiving input from the users. It is noted that while a survey or questionnaire is typically used for long-term or ongoing discussions (e.g., related to politics) a poll may be used by embodiments for real time or short-term purposes, e.g., a poll is used for arranging dinner with friends this evening, meeting tomorrow for a bike ride etc. Thus, a poll enables members to quickly and easily coordinate events, meetings, activities and the like and, as described, an interactive message related to a poll provides members with useful information, e.g., who and how many members said they'll attend a meeting, who already arrived at the meeting place and so on.

In some embodiments, some of the components shown in FIG. 1 may be omitted. For example, memory 120 may be a non-volatile memory having the storage capacity of storage system 130. Accordingly, although shown as a separate component, storage system 130 may be embedded or included in system 100, e.g., in memory 120. For example, a server may include, or be operatively connected to, a storage system 130 and users' computing devices 100 may not include storage system 130.

I/O components 135 may be, may be used for connecting (e.g., via included ports) or they may include: a mouse; a keyboard; a touch-screen or pad or any suitable input device. I/O components may include one or more screens, touch-screens, displays or monitors, speakers and/or any other suitable output devices. Any applicable I/O components may be connected to computing device 100 as shown by I/O components 135, for example, a wired or wireless network interface card (NIC), a universal serial bus (USB) device or an external hard drive may be included in I/O components 135.

A system according to some embodiments of the invention may include components such as, but not limited to, a plurality of central processing units (CPU) or any other suitable multi-purpose or specific processors, controllers, microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

Where applicable, modules or units described herein, may be similar to, or may include components of, device 100 described herein. For example, server 210, wireless computing devices 220 and computing devices 230 shown in FIG. 2 and described herein may be, or may include, a controller 105, a memory 120 and an executable code 125.

The term "chatroom" as used in this application refers to any platform (typically including at least one server) enabling users to communicate, possibly in real time and such that all members in the chatroom see or receive content posted in, or uploaded to the chatroom as known in the art.

The term "chatroom member" as used in this application refers to a user who registered with a chatroom or was otherwise included in a group of users who can communicate in the chatroom, e.g., a group's chatroom manager or administrator can add a user to the group thus making the user a member of the group who can see content in the chatroom and send, or upload, content to the chatroom.

The terms "community", "entire community" or "platform community" as used in this application refer to a plurality of users who can communicate over a platform, e.g., an entire community may be the set of users who installed a specific application on their computing device or who registered, or opened an account with, a specific platform. For example, the set of users who use, or have an account in Facebook are a community or entire community, the set of users who use or are registered with Google+ are another community or entire community and so on. The term "friend" as used in this application refers to a connection or relation established within a platform, for example, a friend in Facebook as known in the art.

The term "super-message" as used in this application refers to message that includes code that causes a controller (e.g., controller 105 included in a user communication device and/or in a server) to perform at least one action. Super messages are further described herein, e.g., with reference to FIG. 4.

Figure 2:
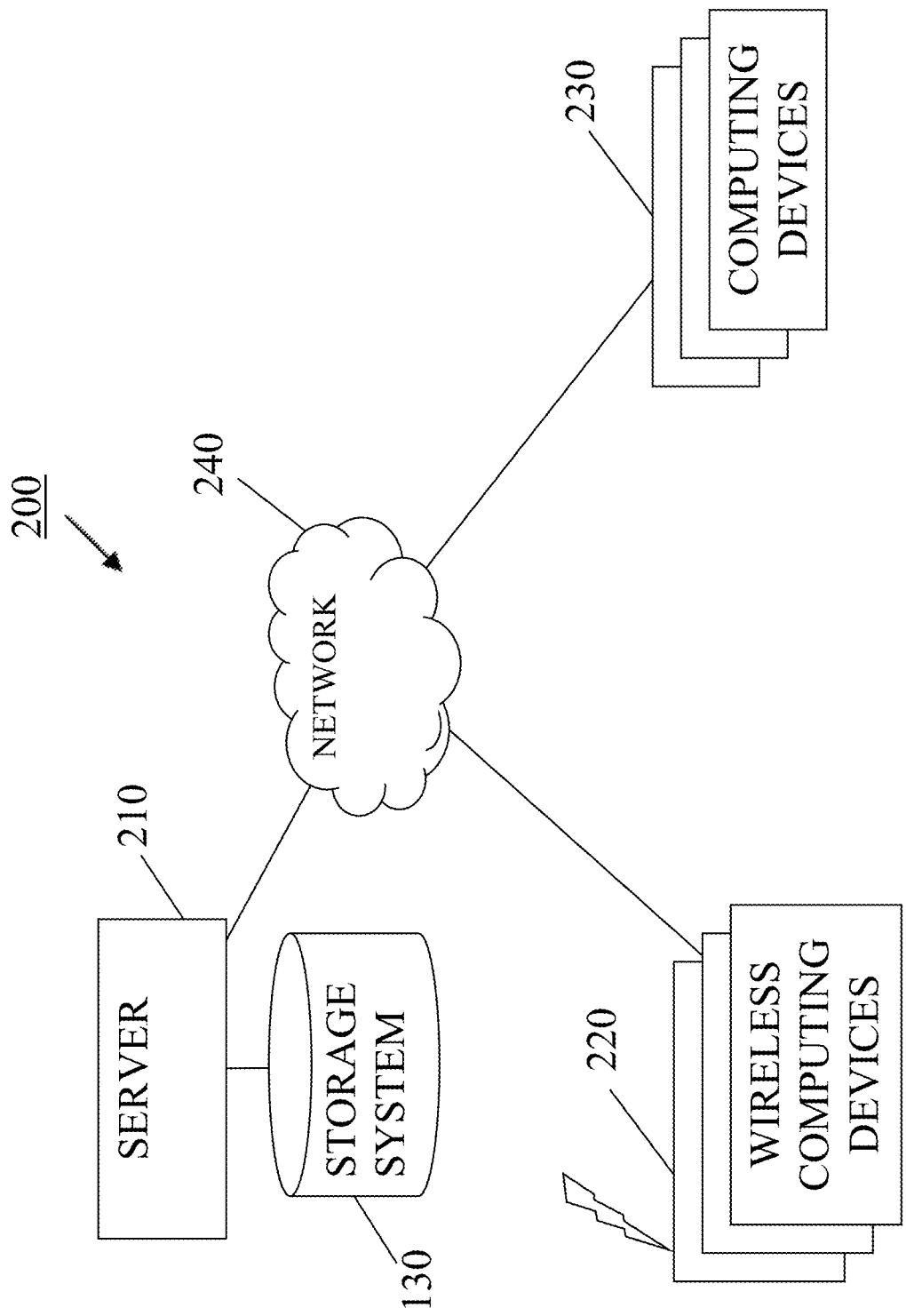
FIG. 2 is an overview of a system according to illustrative embodiments of the present invention.

Reference is made to FIG. 2, an overview of a system 200 according to some embodiments of the present invention. As shown, system 200 may include server 210 that may be operatively connected to storage system 130. For the sake of simplicity, only one server 210 is shown and described, however, it will be understood that any number of servers may be included in a system. As further shown, system 200 may include a plurality of wireless computing devices 220 that may be cellular phones or smartphones and a plurality of computing devices 230 that may be home computers, tablets and the like. In some embodiments, system 200 includes large numbers of wireless computing devices 220 and computing devices 230 operated by users and enabling users to communicate in chatrooms and share content as described herein.

As shown, system 200 may include a network 240. Network 240 may be, may comprise or may be part of a private or public IP network, or the internet, or a combination thereof. Additionally, or alternatively, network 240 may be, comprise or be part of a global system for mobile communications (GSM) network. For example, network 240 may include or comprise an IP network such as the internet, a GSM related network and any equipment for bridging or otherwise connecting such networks as known in the art. In addition, network 240 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 240 are implied but not shown, e.g., access points, base stations, communication satellites, GPS satellites, routers, telephone switches, etc. It will be recognized that embodiments of the invention are not limited by the nature of network 240.

Embodiments of the present invention include a software platform designed to run on mobile devices, such as cellular phones and smartphones, that implements intertwined social networking services and instant messaging services in order to provide online groups with advanced tools and features to ease and enhance online group use and management.

Embodiments of the present invention include a system and method that enables a user to switch with only one, single click from an instant messaging service to a social networking service and vice-versa, more particularly, embodiments of the present invention enable the user to toggle with only one, single click from a group's chatroom screen to a group's content page screen and vice-versa.

Embodiments of the present invention provide or facilitate an online service designed that enables any online group of people to share their group content in the same group's content pages, more particularly, embodiments of the present invention enable each individual user that is a group member to share his/her content in the group's content pages and the shared content is distinguished by indicating the details of the group member who generated and/or shared the content.

Embodiments of the present invention provide online group members with the ability to determine the level of exposure of the group content pages, more particularly, who can access shared content. For example, an exposure level can be one of: only group members, friends of group members or every user who is a member of community of users. In some embodiments, content and text shared or posted in a chatroom can only be viewed by members of the chatroom while content shared in content pages (also referred to herein as "online group content pages") can be shared with users who are not such members. Accordingly, a group chatroom may be kept as a private forum in which content can only be accessed by group members while content pages outside the chatroom can be selectively shared.

Embodiments of the present invention provide an online group with a chatroom that is intertwined with the group's content page and enable the group members to send messages and chat inside the group chatroom. In some embodiments the chatroom can be accessed by the group members only, and the embodiments prevent access to content in the chatroom by any user who is not a member of the group. As described, a group member can share and post content (e.g., in group content pages) that can be selectively accessed by one or more of: specific users, the group members, friends of group members or an entire community (e.g., all users who installed a specific application on their devices).

The interwinding or association of a chatroom that enables group members to exchange instant messages as described and content pages of a social network or platform may be, or may include an association of one or more group shared content objects 131, interactive messages 132, reminders 133, automatic messages 134 and group chatroom content objects 135 with a chatroom. For example, upon defining, creating or establishing a chatroom for a group of members, one or more of content objects 131, interactive messages 132, reminders 133, automatic messages 134 and group chatroom content objects 135 may be created for and/or associated with, the chatroom, e.g., by server 210. Accordingly, in some embodiments, each chatroom has its set of one or more of content objects 131, interactive messages 132, reminders 133, automatic messages 134 and group chatroom content objects 135 that are used by a system and method to quickly and easily carry users from a message based chat platform such as a chatroom (e.g., as shown by screen 310 and described herein) to a social network, platform or service, e.g., as provided to users in screen 320 and described herein.

Embodiments of the present invention provide include super-messages that can be sent to a group chatroom and can be interacted with by members of the chatroom. In some embodiments, s super-message encodes an operation code. In some embodiments, an operation code in a super-message is translated, upon a click on the super-message, to an action and/or type of activity for the group and/or for the group member, more particularly, a super-message generates a specific action, e.g. a group reminder or group poll as described herein, where the specific action is based on, or derived by, an encoded operation code in the message.

Embodiments of the present invention simplify and streamline the ability of group members to communicate within the chatroom and reduce the amount of chat messages in the group's chatroom, more particularly, embodiments of the present invention provide group members with tools and features to deliver messages and to express themselves, with less interferences by other group members' chat-messages and with reduced chat-messages traffic. For example, a single super-message can replace a large number of otherwise required messages.

For example, a super-message can be used for conducting a poll, for instance, in order to get a group decision in certain dilemma, which, without the super-message and as done in known systems, involves a huge amount of chat messages in the group chatroom. For example, a super-message can implement a poll question by encoding poll related actions, for example, the distribution of members' votes, and these actions can be handled and managed outside the group chatroom. Accordingly, using a super-message, a system can reduce the number of chat messages in a chatroom that would otherwise be generated if the group members had to exchange messages required for reaching a decision as done in known or current chatrooms.

Embodiments of the present invention include group reminders mechanisms usable to enable a group member to generate a group reminder that is being managed in parallel to the chatroom activity, more particularly, in some embodiments, a group reminder's activity is being tagged and documented in a separate task, outside the group chatroom, yet the reminder messages are still part of the chatroom traffic.

Embodiments of the present invention provide a mechanism for location based reminders that enable group members to generate group reminders which are invoked by location. For example, a group reminder can send messages to the chatroom when group members arrive at a predefined location, or a predefined perimeter or distance from the predefined location, in a predefined time-window. In some embodiments, the reminders are executed, triggered and/or generated in parallel to the chatroom activity, for example, group location based reminders are managed by a separate task (e.g., on or by server 210) however, location based reminders are still part of the chatroom traffic, e.g., messages caused by group reminders are sent to the chatroom where group members can see them.

Providing reminders may be done by a system and method according to one or more rules, criteria or registration. For example, a default rule may dictate that only members who confirmed a reminder will receive updates related to the reminder, e.g., only members who confirmed meeting at a restaurant will receive messages informing who already arrived, who will arrive soon and so on as described. In another configuration, users who are not members of the group may register with a system and be provided with messages related to a reminder. For example, parents of a young group member may register, via server 210, for location based reminders of their child's group chatroom and thus be automatically informed when their child arrived at a location, e.g., during a trip as described.

Reminders may be automatic and/or periodic. For example, a location based reminder for a group that includes a parent and a child may be set to repeat every day other than Saturday and Sunday and the location of the reminder may be set to the child's school. Accordingly, the parent can get a daily message informing the parent the child arrived at school.

Embodiments of the present invention implement and provide an automatic chat messages mechanism that enables a group member to send a timed chat-message that may be chosen randomly from a set of pre-defined chat-messages, in a predefined time window, to the chatroom.

Some embodiments of the present invention manage a set of tasks and resources for group activity, e.g., a trip. For example, some embodiments of the invention enable group members to effectively and systematically divide the roles and resources required to perform a group task. In some embodiments, group task management is being tagged and documented in a separate task, outside the group chatroom, although automatically generated task messages, representing the role of each group member, are still be part of the chatroom traffic, that is, sent to the chatroom as other messages therein.

Figure 3:
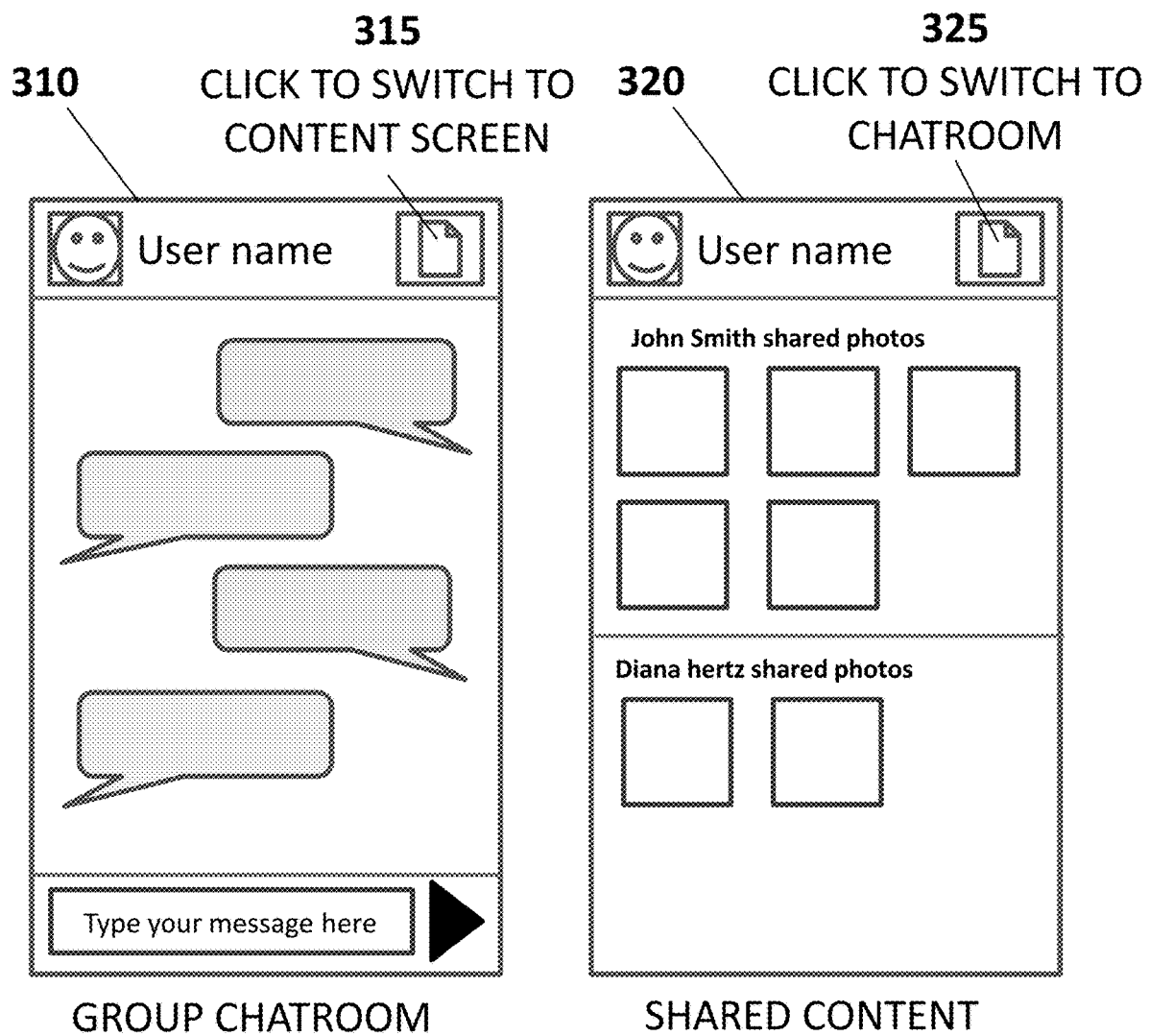
FIG. 3 schematically shows screenshots according to illustrative embodiments of the present invention.

Reference is made to FIG. 3, showing screenshots according to illustrative embodiments of the present invention. Screenshot 310 shows a schematic example of a group chatroom screen and screenshot 320 shows a schematic example of a shared content screen.

Generally, screen 310 shows a typical chatroom which serves as the main component of an instant messaging service and screen 320 shows a typical content page which serves as a component of a social networking service. As shown, screens 310 and 320 in this exemplary embodiment include a button (315 and 325) that enable a user to switch, by a single click, between a group's chatroom and group's content pages.

For example, screen 320 shows content shared by members of the group. As shown, a button 315 in screen 310 enables a user to be carried to screen 320 with a single click on button 315. Similarly, by a single cling on button 325 in screen 320, the user is presented with screen 310 where he/she can communicate in the group's chatroom. Accordingly, embodiments of the invention enable users to quickly, easily and readily and within a single application, move from a chatroom or IM screen to a social network where content such as images and multimedia is shared between users. For example, content in group chatroom content objects 135 is presented in screen 310 and content in group shared content objects 131 is presented on screen 320.

Accordingly, a computer-implemented method of managing communication according to embodiments of the invention includes presenting a first screen (e.g., screen 310) enabling a user to communicate in a group chatroom over an instant messaging platform; and, based on a single click on a button in the first screen (e.g., button 315), presenting a second screen enabling the user to view group's content over a social media platform (e.g., screen 320). A method can further include reverting to the first screen based on a single click on a button in the second screen, e.g., going back from screen 320 to screen 310 based on a single click on button 325 as described. As described, the first screen (e.g., screen 310) shows chat messages exchanged between members of a chatroom and the second screen (e.g., screen 320) shows content shared by the group members. It will be recognized that content presented in screens 310 and 320 can be of any type, e.g., text, images and multimedia content.

Although only two screens a user can be presented with based on a single click are shown and described, it will be understood that any number of different screens can be included in embodiments of the invention. For example, a set of buttons similar to buttons 315 and 325 can be placed at the top of screens and a single click on each of the buttons causes a system to present a respective, different screen. For example, polls described herein can be viewed and interacted with in a third screen, reminders can be viewed and interacted with in a fourth screen and so on.

Embodiments of the invention support and provide various exposure levels for shared content. For example, based on a configuration or attributes of specific content objects, content in group shared content objects 131 is selectively shared with one of: only members of the group chatroom, friends of members of the group chatroom and with the entire community of a social media platform. For example, content in screen 320 can be viewed only by members of the group and access to content in screen 310 can be denied to any other user or, the content in screen 320 can be viewed by members of the group and their friends in the social network and/or in content in screen 320 can be viewed by anyone who is part of a social network or social media platform, e.g., anyone who installs a specific application on his/her computing device.

Figures 4A, 4B:
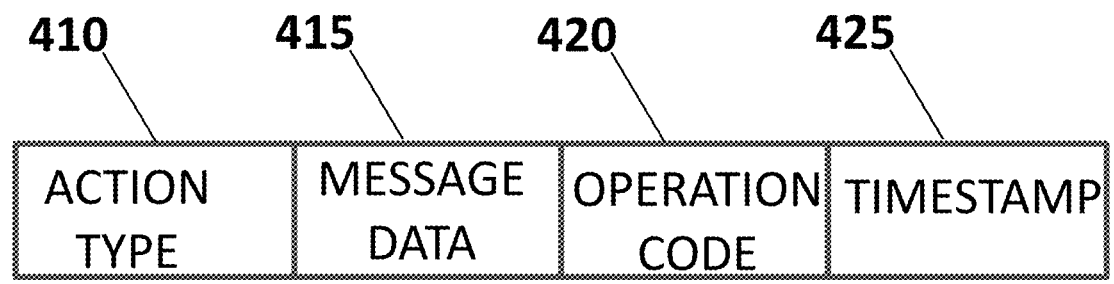
FIG. 4A schematically shows a super-message according to illustrative embodiments of the present invention.
FIG. 4B schematically shows a super-message according to illustrative embodiments of the present invention.

Reference is made to FIG. 4A, schematically showing a super-message according to illustrative embodiments of the present invention. Reference is additionally made to FIG. 4B which schematically shows a super-message according to illustrative embodiments of the present invention. In some embodiments, interactive messages 132, reminders 133 and automatic messages 134 include some or all of the elements shown in FIG. 4A. It will be recognized that additional elements or fields may be included in interactive messages 132, reminders 133 and automatic messages 134. For the sake of clarity and simplicity, interactive messages 132, reminders 133 and automatic messages 134 are referred to herein as super messages or super-messages.

Generally, a super-message is an atomic unit which is a complex chat-message, in which the unique identifier 410 represents an action and/or type of operation and/or the group activity related to the super-message, the timestamp 425 may be used to manage the super-message action by time and the message data field 415 can include the action data (e.g. the group poll question, expiration time, list of resources, list of required actions as described herein). The message operation code 420 can be used to indicate sub-operations (e.g. a "Yes/Mo" poll, "Four Choices" poll etc.)

As shown, in some embodiments a super message includes an action type 410, message data 415, an operation code 420 and a timestamp 425. For example, and as shown by FIG. 4B, an action type 410 can be a unique identifier that uniquely identifies the type of action performed with relation to the message, message data 415 can be a question (e.g., text) in case the message is related to a poll, operation code 420 can be the type of the poll, a time window for the poll and the like and timestamp 425 can be the time the message was sent or generated expressed as Unix time value as known in the art (for example, 1495391012 is equivalent to 18:23 (UTC) May 21, 2017).

Super messages as described herein can cause a system to perform various actions they may be executed or performed in parallel to activity in the chatroom. For example, server 210 may act as a virtual user of, or member in, a chatroom and can send messages to the chatroom, cause messages to perform actions and so on.

In some embodiments super messages are interactive, that is, when clicked, a super message can perform an action, receive input, present output and so on. For example, based on action type 410, operation code 420 and/or other fields or metadata in a super message (not all are shown in FIG. 4A for the sake of simplicity and clarity), when clicked on, a super message performs one or more actions, e.g., present information to a user, send information to server 210, present a popup window that presents data or receives input from a user and the like.

In some embodiments, a super message is encoded by using American Standard Code for Information Interchange (ASCII) code and/or by using eXtensible Markup Language (XML) coding as a method and/or using JSON JavaScript Object Notation (JSON) as method for encoding and decoding the super-message and/or any other methods that will be found as useful.

In some embodiments, a system can dynamically and automatically change and manipulate a super message in the chatroom, e.g., as a function of time and/or based clicks on the message. For example, based on timestamp 425 and/or a time value in operation code 420, wireless computing device 220 or server 210 can generate a message or perform an action as further described herein. In one case or example, a super message can be generated or created by a user for conducting a survey or poll. For example, to get the opinion or vote of the group members on whether or not the group should gather at a suggested date or raise money for a cause, the user clicks on a menu button (not shown) and is presented with a screen that enables entering a question and sending the poll (in the form of a super message) to the chatroom. In some embodiments, a poll can be presented to users in a screen other than the screen of the chatroom. For example, in a way similar to switching from screens 310 and 320, a user can switch to a survey or poll screen where he/she can vote.

Figure 5A:
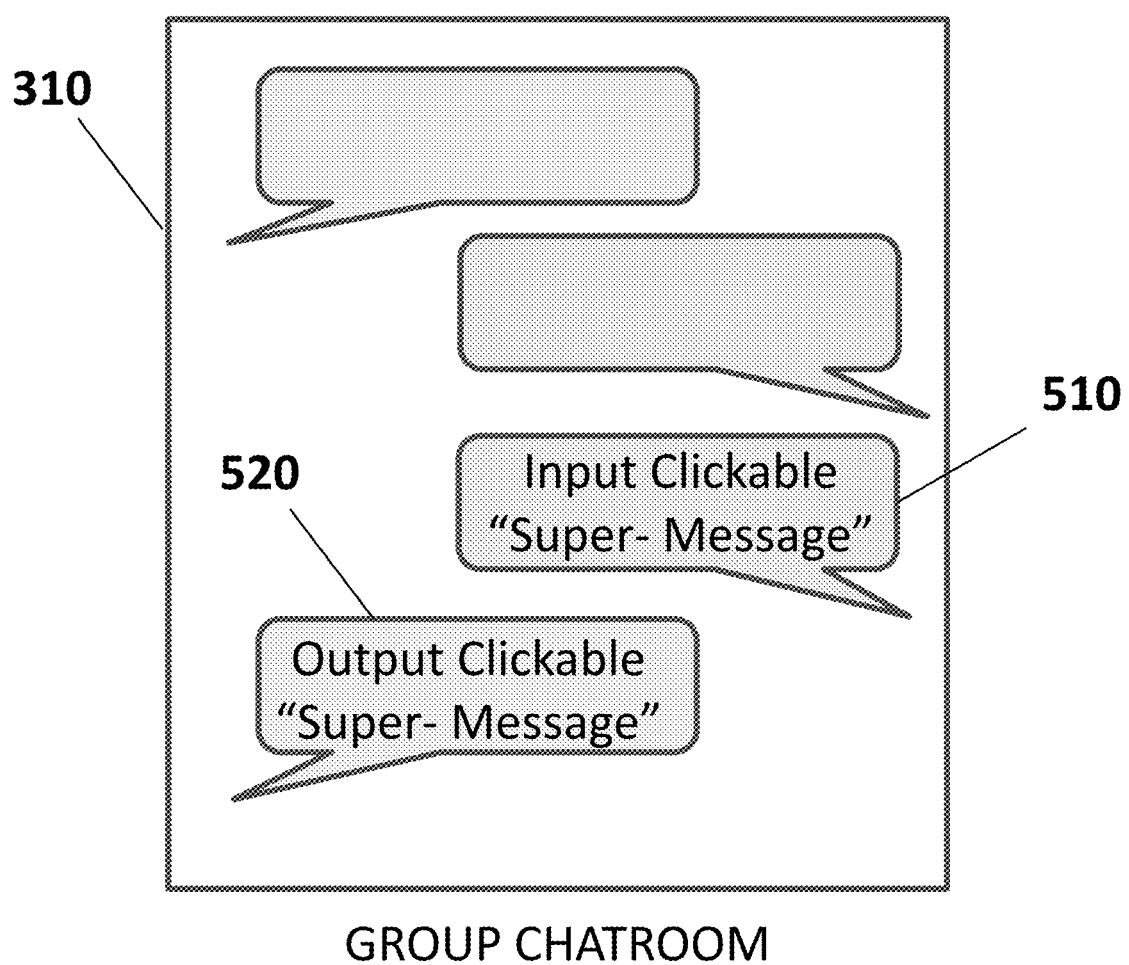
FIG. 5A schematically shows a screenshot according to illustrative embodiments of the present invention.
Figure 5B:
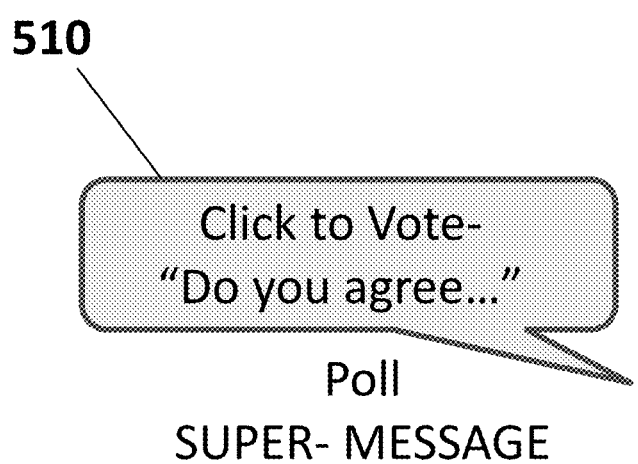
FIG. 5B shows a super-message according to illustrative embodiments of the present invention.

Reference is made to FIG. 5A, schematically showing a screenshot 310 according to illustrative embodiments of the present invention. Reference is additionally made to FIG. 5B which shows a super-message according to illustrative embodiments of the present invention. As shown, a super message 510 is a clickable input message and super message 520 is an output clickable message in a chatroom screen 310.

Figure 6A:
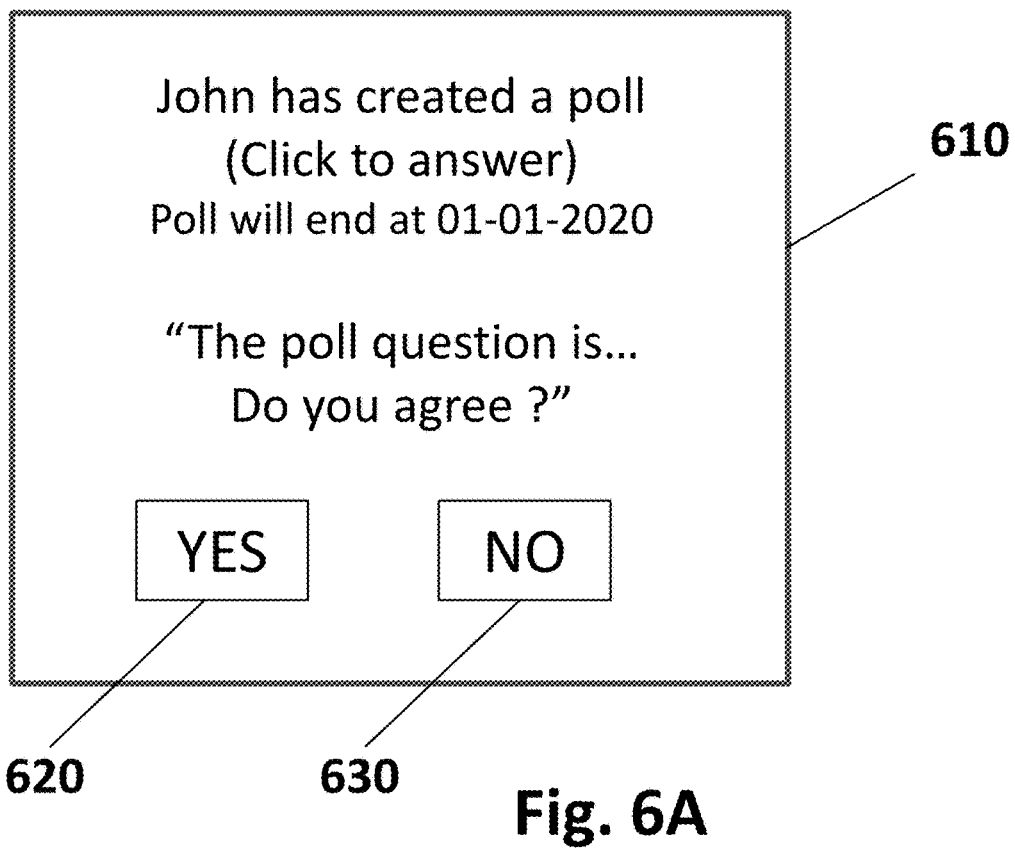
FIG. 6A shows a pop-up dialog message according to illustrative embodiments of the present invention.
Figure 6B:
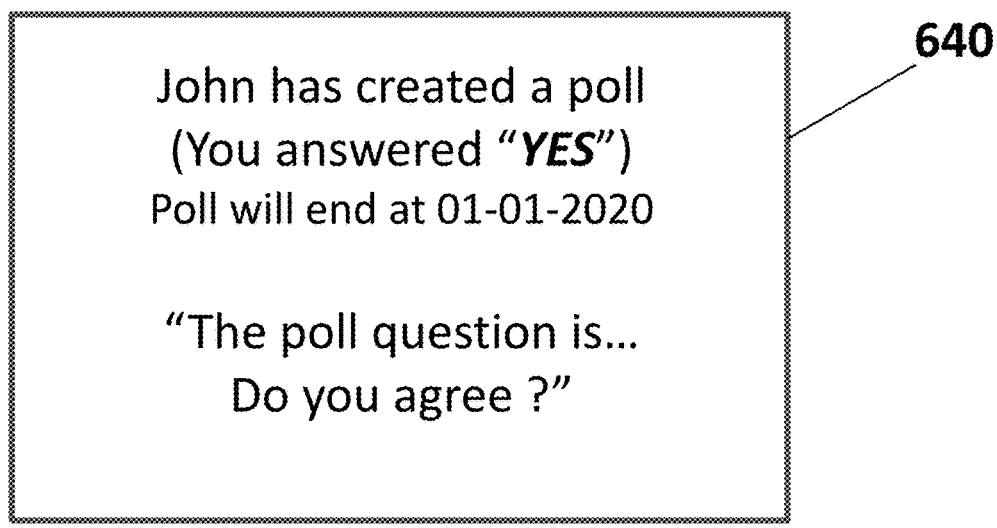
FIG. 6B shows a pop-up message according to illustrative embodiments of the present invention.

Reference is made to FIG. 6A, a pop-up, interactive, dialog message 610 according to illustrative embodiments of the present invention. Reference is additionally made to FIG. 6B, a pop-up message 640 according to illustrative embodiments of the present invention.

FIGS. 5A, 5B, 6A and 6B generally illustrate a chatroom and/or group chatroom in which each bubble speech or chat-message 510 and 520 is clickable super-message and the click invokes a unique operation and/or group activity based on type of the clicked super-message. For example, a click on a bubble speech that is a poll super-message invokes a poll, e.g., opens a dialog box 610 with the poll question enabling the user is to click "Yes" or "No" in response to a question. A vote of a user can cause the super-message to respond, e.g., show the user's vote as well as other poll details, e.g., when the poll ends, statistics related to the poll etc.

In some embodiments and as shown by block 610, when an interactive super message is clicked, a pop-up window presenting a question and enabling a user to vote is presented. For example, and as shown, the user can click button 620 to vote "Yes" or button 630 to vote "No".

Accordingly, in some embodiments, each group member can vote in a generated poll, by clicking on the poll super message in the group chatroom. Using pop-ups or other techniques, the voting can be carried out in screens other than a screen used for sending and reading group messages (e.g., in a screen other than screens 310 and 320). As shown by block 640, possibly but not necessarily, after a user votes, a pop-up providing information related to a poll is presented. For example, a screen or pop-up window as shown by block 640 showing vote statistics, who already voted, how other users voted and so on is presented thus enabling users to know the status of a poll.

In some embodiments, a group member can generate and/or create a reminder, and the reminder is encoded in a super-message in the group chatroom and the reminders activity is in different screen outside the chatroom screen. For example, a reminder created by a group member is stored as a reminder 133 by server 210 and managed by server 210.

In some embodiments, each group member can confirm or deny his/her participation in, or compliance with a reminder, as described herein, by a click on the super-message and following an interactive dialog that is popped-up to let the user to react. In some embodiments, when interacted with, a super-message changes accordingly to reflect the user reaction or input and the reminders activity screen is changed in parallel to the group chatroom. When a reminder's time arrives, server 210 or a unit in the user's computing device sends or activates the reminder message only to the group members who have confirmed the reminder, e.g., indicated they intend to participate in an event.

In some embodiments, group members can create a location based reminder. A location based reminder is invoked only when the group member, who confirmed the reminder, is arriving to the address or location in the reminder. For example, using a phone's GPS, the location of a user is reported to server 210 and upon an arrival of the user to the location, server 210 sends a message to other users, informing them that the user has arrived at the location.

In some embodiments, a location based reminder is encoded in a super message as described. A user's location is not disclosed to other users, rather, only when the user arrives at the location (or is within a predefined distance from the location) a message is sent to all other users in the group. Accordingly, embodiments of the invention enable group members to know who already arrived at a meeting place while, at the same time, maintain users' privacy. In some embodiments, a group member that denies his/her participation in a group location based or other reminder will not be part of this group reminder, that is, he/she will not get messages informing arrival of other users to the location and other users in the group will not be informed of the user's location.

In some embodiments, location based reminders as described herein are defined as a part of, or included in, multiple, consecutives location based reminders. Accordingly, an activity related to multiple locations (e.g., a trip) is generated and can be documented or saved. Otherwise described, an ongoing group activity, that actually describes a planned activity as function of time intervals (e.g. a group travel to multiple locations) is generated, can be used as described and can be recorded for future activities. For example, a set of location based reminders 133 generated and used as described by a first group can be provided by server 210 to a second group of users who can use it to take a trip along a path taken by the first group of users.

In some embodiments, a set of reminders, e.g., location based reminders can by shared in a way similar to sharing group content as described. For example, a group manager can set the level of exposure of a set of location based reminders describing a trip or other activity such that the set of location based reminders describing the activity are shared with only group members, friends of the group members or everyone in a software platform community.

In some embodiments, a set of reminders can be exported and then imported. For example, a set of location based reminders 133 of a first group can be exported from server 210 and imported to another server 210 and/or to a set of location based reminders 133 of a second, different group thus enabling the second group to travel along the same route as the first group, importing a set of reminders as described can dramatically ease planning a trip or activity. Of course, after importing a set of location based or other reminders, the imported set can be customized or changed as can be done with any reminders described herein.

In some embodiments, server 210 sends auto-generated super-messages to the group chatroom, at predefined times and/or based on predefined locations, and the group activity. For example, with respect to location based reminders, server 210 sends a message to all relevant users every half an hour informing them who already arrived at the location, in another case, e.g., when a poll is conducted, server 210 sends a daily message to users that provide relevant information, e.g., who already voted, how users voted etc.

Some embodiments of the invention support and enable collaboration of group members in performing a task or achieving a goal. For example, a super message can include a number of tasks or resources and each of the group members can select or choose a task he/she will perform or select a resource or item he/she will provide. For example, a super message related to dinner includes menu items, e.g., salad, drinks, main course or dish and each of the group members can select what he/she will bring. The super message can be interactive as described and can further display information as described, e.g., all group members can see who already selected something they'll bring to the meal, what they'll bring and so on. For example, in the above example, an interactive message 132 is created for the dinner and is stored in storage system 130. Each time one of the group members selects a dish he/she will bring, server 210 updates the interactive message 132 and sends a (or updates the) super message in the chatroom such that all members of the group see the update.

In some embodiments, when a user clicks on a super-message as described, status, information or metadata is displayed, e.g., the division or allocation of tasks and resources among group members thus enabling members of the group to pick one of the remaining tasks and/or resources in order to contribute the accomplishment of a group's activity. As described, a super-message may be changed according to selections made by group members to reflect users' selections. As described, an activity screen presenting information related to a group's activity may be separate from the screen that shows chats and/or contents as described.

A super message may be time based. For example, an expiration time may be included in, or associated with a super message, e.g., users must pick a task to perform no later than a specific time or date after which no more selections are possible. For example, after a time specified in a super message has passed, server 210 may no longer update an interactive message 132 with users' choices or picks. In another example, a location based reminder 133 may enable users to join an event or activity during a time window after which users can no longer join the event or activity.

In some embodiments, a unit (e.g., software and controller 105) in each mobile or other device of a group member, modifies a super-message instantly, in the group chatroom, to reflect the user reaction to the super-message, and accordingly to the type of action encoded in the message, and in addition, the appropriate activity screen is changed in parallel to the group chatroom. For example, when a user joins an activity, the super message related to the activity is changed in each of devices 220 and/or 230 to reflect that the user has joined the activity.

In some embodiments, a system transforms some ASCII characters (for example—ASCII emoticon or Emoji Unicode characters) encoded in the super-message to Bluetooth transmission from a mobile or other device of the group member to sensory messages that are provided, to the user, by a set of actuators and/or vibrators on wearable or other devices. Such sensory message may include a predefined pattern of buzzing or vibrations that inform the group member of an event, e.g., a reminder as described herein. Accordingly, group events can be provided to a user using Bluetooth devices, e.g., wearable devices.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

For purposes of ease of explanation only, the present application discloses embodiments related to software designed to implement intertwined social networking service with an instant messaging service to provide tools and features to ease and enhance the conduct of the group members in a group chatroom and group content pages, however, it is to be understood that the scope of the present invention is not limited to group management but rather to any form of users interaction over social networking and/or instant messaging services.

In some embodiments, a computer-implemented method includes presenting a first screen enabling a user to communicate in a group chatroom over an instant messaging platform; and based on a single click on a button in the first screen, presenting a second screen enabling the user to view group's content over a social media platform.

In some embodiments, content of a chatroom group is selectively shared with at least one of: members of the chatroom group, friends of members of the chatroom group and with an entire community of a social media platform. For example, content shared as shown by screen 320 can be shared only by and with the relevant chatroom group members or it can further be shared with social media platform friends of the chatroom group members or it may be open to, or freely accessed by, an entire social media platform. For example, based on a configuration, server 210 can allow access to group shared content objects 131 only to users who are part of a group or server 210 can allow a list of friends of the users to access objects 131 or server 210 can allow anyone to access (e.g., view) objects 131, for example, using a link or unique resource locator (URL) or uniform resource identifier (URI) as known in the art.

Selective sharing of content can be global, e.g., applied to all content shared by a group or it can be per content object. For example, based on metadata in, or associated with a first group shared content object 131 the first object can be viewed only be members of the group and, based on metadata in, or associated with a second group shared content object 131, the second object can be viewed by an entire community.

In some embodiment, a collective consent of the group members is required for sharing a shared content object 131 with users other than members of the group. For example, server 210 receives consent or dissent to share a content object from each group member and, only if all members of the group agree to share the object then server 210 allows users other than the group members to access to the content object. Any information related to sharing a content object may be stored in shared content object 131, e.g., in the form of metadata accompanying an image or multimedia in a shared content object 131.

In some embodiment, an interactive message (e.g., super message) is presented in a predefined position in a screen and the predefined position of the message is maintained, e.g., during scrolling through content in the screen. For example, a unit in devices 220 and/or 230 keeps an interactive message (e.g., a message related to a poll as described) at the bottom or top of the screen regardless of a scrolling through the screen such that the interactive message is kept or shown as the last message received or such that, regardless of scrolling, the interactive message is always shown, that is, the interactive message cannot be scrolled up or down and out of the screen. Accordingly, a message that requires input from a user (e.g., a poll or a message related to collaborating in a group effort or task) can be kept on screen until the user responds or interacts with the message, the advantage of maintaining a message on screen regardless of scrolling can be readily appreciated as it prevents cases where important messages are mistakenly ignored or skipped due to subsequent messages that push (or scroll) important messages out of the screen.

In some embodiment, an interactive message (e.g., super message) is distinguished by at least one of: a foreground color, a background color, a sound, displaying the interactive message in a popup window, displaying the interactive message in a floating window and prioritizing the interactive message by placing it as the last received message thus maintaining it as the newest received message. For example, based on metadata in a super message (e.g., in a message displayed based on one of messages 132, reminders 133 and/or automatic messages 134), a unit in devices 220 and/or 230 applies a foreground or background color to the message when displaying it in screen 310 or the unit pops the message out from the screen, provides an audible effect when the message is received and/or displayed or the unit shows or places the message in a floating window or prioritizes the message by placing it as the last received message. Effects applied to a message as described may be based on configuration parameters in the message as stored in storage 130 and as described.

In some embodiment, an interaction of a user with an interactive message is reflected in a set of corresponding interactive messages presented to a respective set of users. For example, based on an interaction of a user with an interactive message, a unit in devices 220 and/or 230 sends a message to server 210 informing server 210 of the interaction (possibly including data, e.g., "the user voted "Yes", "The user agreed to participate in a meeting". Based on a message received from one of device 220 or 230, server 210 may update data in an object in storage 130 (e.g., update an interactive message 132 object) and may further send messages to all other members of the group, e.g., a message that includes the updated interactive message 132 object or data therein. Accordingly, members of a group can be kept up to date, or synchronized with respect to interactive messages.

As described, a super message can be related to one or more of: a task of the group, a survey, a poll, a group reminder and an event related to at least some of the group members. In some embodiment, a group reminder is related to a predefined location and a click on an interactive message related to the group reminder displays at least one of: the group members who arrived at the location, an estimated time of arrival of group members to the location and the arrival time of group members to the location. For example, a group of users decides to meet for dinner on Monday at 19:30 in a restaurant at 134 Main street. One of the users then creates a group reminder (an interactive or super message) that includes the location, date and time as agreed, optionally, each of the group members confirms attending using the interactive time-based reminder and a number of operations may be performed by server 210 and units in computing devices 220 of the group members based on the reminder.

For example, based on the current time and a distance of a user from 134 Main street, the user's computing device may alert the user that it is time to start traveling to 134 Main street. Another example of an operation related to a location based reminder is, when a group member arrives at the restaurant, his/her computing device sends a message to server 210 that updates all other members who agreed to meet that the member has arrived, e.g., a list of all members who already arrived at the restaurant is updated in a reminder object 133 and is sent to all relevant users or members. Yet another example of an operation is a periodic update sent to all members informing them when one or more users is expected to arrive at the restaurant, for example, using GPS and other data (e.g., traffic, weather etc.), a unit in computing device 220 reports to server 210 an estimated time of arrival and server 210 updates all other relevant users as described.

In some embodiments, based on information sent from units in users' computing device 220, server 210 updates an interactive message in a chatroom based on at least one of: an arrival of a group member to the location, a delay in arrival of a group member to the location and a departure of a group member from the location. Server 210 can update users by sending them a message and/or by updating an interactive message, e.g., the interactive message created as described is updated by server 210 when appropriate (e.g., when a member arrives at the restaurant), server 210 informs units in computing devices 220 that the message was updated, the units retrieve the updated message from server 210 and inform users of the update, e.g., using a sound, screen flash or any other suitable method.

In some embodiments, information related to a group reminder is provided to a provider of services or goods or gear for the group activity, as defined in the reminder, and the provider is permitted and/or enabled to send messages to the chatroom. For example, if the group is planning a white-water rafting trip or a bike trip at some location then server 210 searches for relevant instructors or guides, shops where one can rent equipment, lodging and/or any other services available in the location or area of the trip. For example, either automatically extracting relevant words from a conversation in a chatroom or provided with the key words, e.g., "biking", "Closter, N.J." "Wednesday until Friday" server 210 finds, e.g., in the internet, shops that rent out bikes, lodging in Closter etc., provides the shops or other service providers access to the chatroom, e.g., server 210 receives messages from the suppliers of services and goods and server 210 selectively injects or sends the messages to the group's chatroom (e.g., acting as a virtual user as described).

Accordingly, location based reminders can be used, as needed, to notify service or gear suppliers or providers about the desire of a user or group to get to a location for a specific purpose or group activity, and the providers are able to offer their services or gear for the group activity, as defined in the reminder, to the user or group, over an instant messaging platform, e.g., over or in the group chatroom, with or without getting the user details. In some embodiments, group members are enabled to make a transaction, based on one or more of commercial offers sent to them by the service or gear suppliers. Accordingly, a marketplace allowing commercial entities to get information about potential customer that will arrive to their area in a well-defined time window and with a specific, known purpose or plan, e.g., a bike ride at a specific location and time as described in the above example.

In some embodiments, sharing or sending content may be scheduled for future time such that content or messages are automatically sent or shared at a future time. Automatic sending or sharing content or messages can include selecting, from a set of content objects or messages one or more content objects or messages to be sent or shared. An embodiment may receive, from a user, a future time window for sending a message, receive a set of at least one message or content objects to be sent and the embodiment may randomly select one or more messages or content objects included in the set and send or share the selected messages content objects during the time window. An embodiment may receive one or more destinations or recipients and send or share the selected messages content objects during the time window to the one or more destinations or recipients.

For example, provided with a dialog box, a user of computing device 220 selects a set of messages such as "Dinner tonight?", "Want to go to a movie?" and "Shall we visit John sometime soon?", selects a time window, e.g., "24/12/17-24/01/18", "any time after 24/05/17" or "repeat every third week of each month", and selects one or more recipients or destinations, e.g., one or more phone numbers of a friend and/or a chatroom. In some embodiments, an automatic message 134 is created based on input from the user and is stored in storage system 130 as shown and, using information and configuration in the automatic message 134, server 210 randomly selects one of the messages or content objects in the set, randomly selects a time and/or date in the time window and sends the selected message or content object to the list of recipients or destinations. For example, using automatic scheduling for sharing content, a user can cause pictures taken during a trip to be shared sometime after returning from the trip, be encouraged to meet friends (who reply to auto-generated messages) and so on. It is noted that automatic, scheduled sharing as described may be applicable to either or both of messages (e.g., text messages) and/or content objects (e.g., pictures, video clips and the like).

In some embodiments, automatic sharing or sending content objects or messages as descried is based on at least one of: an event, a location and a condition. For example, a condition for sharing content objects may be related to a location, e.g., share one or more pictures when I'm in Europe, send a message to John after I get a call from George, share a specific picture when I'm 34 years old and so on.

Figure 7:
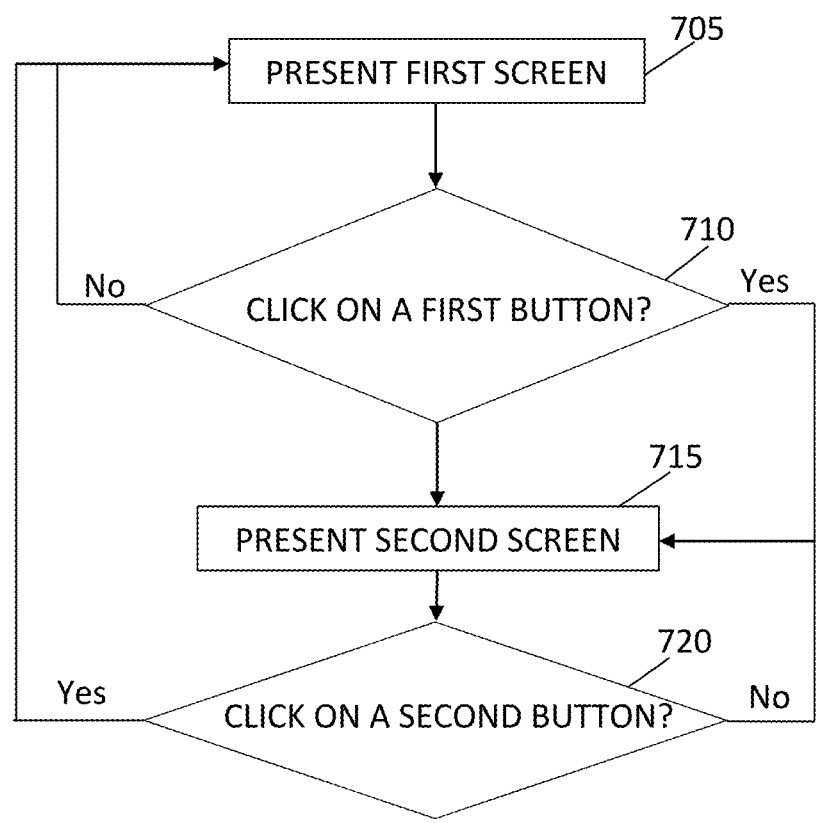
FIG. 7 shows a flowchart of a method according to illustrative embodiments of the present invention.

Reference is made to FIG. 7, a flowchart of a method according to illustrative embodiments of the present invention. As shown by block 705, a first screen may be presented to a user, e.g., a first screen enabling a user to communicate in a group chatroom over an instant messaging platform, for example, screen 310 showing a chatroom as described is presented as the first screen.

As shown by block 710, if a system detects a click on a first button in the first screen, e.g., a click on button 315 is received or identified, then a system and method may present a second, different screen, e.g., a screen that enables users to view group's content over a social media platform, for example, screen 320 is presented as shown by block 715. As shown, as long as no click on button 315 is received, a system and method may continue presenting the first screen where a user can communicate in a chatroom or other messaging platform. As shown by block 720, if while presented with the second screen, a user clicks on a second button in the second screen (e.g., the user clicks on button 325) then a system and method may present the first screen. Accordingly, embodiments of the invention enable a user to easily switch to/from a social platform and a messaging platform. Moreover, and as described, embodiments enable sharing content in a social platform based on various aspects related to a messaging platform, and/or members of a messaging platform, e.g., group members in a chatroom as described. For example, content shown in screen 320 or other content (e.g., pictures in a user's phone gallery) can be shared based on time, location of a member, event related to the chatroom group and so on. In some embodiments, the buttons enabling a transition between the first and second screens or platforms share many attributes, e.g., the location on the screen, the size and color and the design of the first and second screens are identical, same or similar. For example, buttons 315 and 325 are identical other than one aspect that may be one of: a label, a color or a shape.

Although FIG. 7 shows receiving or identifying a click on a first button (in block 710) and receiving or identifying a click on a second button (in block 720), in some embodiments, only one, single button is used for toggling or switching between screens 310 and 320. For example, in some embodiments, buttons 315 and 325 are actually the same button that is shown in screens 310 and 325, as described, for ease of use, some attributes of the button may be set according to the screen shown, e.g., the button may be green when screen 310 is shown and blue when screen 320 is shown.

It will be appreciated that embodiments of the invention are inextricably tied to computer technology, e.g., computerized social networks or platforms and/or instant or other messaging and/or chat platforms. Moreover, embodiments of the invention improve the technological field of computerized social networks or platforms and/or instant or other messaging and/or chat platforms, for example, by reducing the number of messages required as described, enabling users to communicate in ways that cannot be done using known or current systems or methods. Embodiments of the invention address the Internet-centric challenge of enabling users to efficiently and easily communicate in chatrooms, e.g., schedule events and/or collaborate in a performing joint task or achieving a common goal. It is noted that embodiments of the invention do not only manipulates data, e.g., send data from one computer to another but, rather, embodiments of the invention create specific data structures (e.g., shared content objects 131, interactive messages 132, reminders 133, automatic messages 134 and group chatroom content objects 135) that are used for facilitating communications and interactions between users as described.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of managing communication between members of a chatroom group, the method comprising:
presenting, on a first device, an interactive, clickable message, wherein the interactive message presents a first text, and wherein the interactive message includes code that:
causes a controller to perform a first action and replace the first presented text with a second presented text based on a first click by a user anywhere on the interactive message;
causes the controller to perform a second, different action, based on a second, subsequent, click by the user anywhere on the interactive message; and
causes the controller to modify an interactive clickable message presented by at least one other device, wherein the modification includes removing or disabling at least one option from a set of selectable options presented on the at least one other device;
wherein the code further causes the controller to dynamically and automatically, and in response to an elapsed time, do at least one of:
change the interactive message,
select an action to be performed, and
select information to present to the user.

2. The method of claim 1, wherein an interaction of the user with the interactive message is reflected in a set of corresponding interactive messages presented to members of the group on their respective devices.

3. The method of claim 1, wherein the interactive message includes code that causes a controller to perform at least one action wherein the action is selected based on a click on the interactive message.

4. The method of claim 1, wherein the interactive message provides, on a first device of a first member of the group, information related to input received by a second device of a second member of the group.

5. The method of claim 1, wherein, in response to an interaction of a user, the interactive message presents new information related to the interaction.

6. The method of claim 1, further comprising:
in response to an interaction of the user, presenting to the user an interactive screen; and
changing the interactive message in response to an interaction of the user with the interactive screen.

7. The method of claim 1, further comprising:
presenting the interactive message in the chatroom; and
updating the interactive message in response to an interaction of a chatroom member with the interactive message.

8. A computer-implemented method of managing interaction between a user and an interactive message, the method comprising:

providing to a computing device of the user an interactive, clickable message, wherein the interactive message presents a first text, and wherein the interactive message includes code that:
- causes a controller in the computing device to perform a first action and replace the first presented text with a second presented text based on a first click by the user anywhere on the interactive message;
- causes the controller to perform a second, different action, based on a second, subsequent, click by the user anywhere on the interactive message; and
- causes the controller to modify an interactive clickable message presented by at least one other device, wherein the modification includes modifying a set of selectable options presented by the at least one other device.

9. A system comprising:
a memory; and
a controller configured to:
- present, in a first screen, an interactive, clickable message, wherein the interactive message presents a first text and wherein the interactive message includes code that:
  - causes the controller to perform a first action and replace the first presented text with a second presented text based on a first click by a user, anywhere on the interactive message;
  - causes the controller to perform a second, different action, based on a second, subsequent, click by the user anywhere on the interactive message and based on a selection of one of the set of selectable options; and
  - causes the controller to modify an interactive clickable message presented by at least one other device, wherein the modification includes modifying a set of selectable options presented by the at least one other device:
- wherein the code further causes the controller to dynamically and automatically, and in response to an elapsed time, do at least one of:
- change the interactive message,
- select an action to be performed, and
- select information to present to the user.

10. The system of claim 9, wherein the interactive message includes code adapted to cause an interaction of the user with the interactive message to be reflected by a set of interactive messages presented to respective members of a group on their respective devices.

11. The system of claim 9, wherein the interactive message includes code that causes the controller to perform at least one action wherein the action is selected based on a click on the interactive message.

12. The system of claim 9, wherein the interactive message includes code that causes the controller to provide, on a first device of a first member of a group, information related to input received by a second interactive message in a second device of a second member of the group.

13. The system of claim 9, wherein the interactive message includes code that causes the controller to, in response to an interaction of a user, cause the interactive message to present new information related to the interaction.

14. The system of claim 9, further comprising:
presenting the interactive message in the chatroom; and
updating the interactive message in response to an interaction of a chatroom member with the interactive message.

* * * * *